Patented July 31, 1945

2,380,480

UNITED STATES PATENT OFFICE 2,380,480

PROCESS OF PRODUCING BURNT DOLOMITE

Werner Syz, Neuhausen-on-the-Rheinfall, Switzerland, assignor to Aluminium Industrie Aktien-Gesellschaft, Chippis, Switzerland, a joint-stock company of Switzerland No Drawing. Application June 30, 1941, Serial No. 400,483. In Switzerland September 6, 1940

4 Claims. (Cl. 23—186)

According to known processes for the thermal production of magnesium one reduces burnt dolomite by heating it for example up to 1300° C. in vacuo or up to 1600° C. in hydrogen or in another inert gas together with suitable reducing agents such as ferrosilicon, silicoaluminum, silicon carbide, calcium silicide or aluminum. The vapors of metallic magnesium escape from the reacting mass and are condensed in solid or liquid form. Such processes are disclosed for instance in the United States Letters Patents 2,122,435, 2,143,197 and 2,159,910.

Dolomite is composed chiefly of a combination of calcium carbonate and magnesium carbonate; this combination is in the best case an equimolecular one. By burning, for instance in a lime-burning kiln, one obtains therefore principally a mixture of calcium oxide and magnesium oxide. In the practice this mixture has the disadvantage that it absorbs carbon dioxide very quickly when it is stored at the open air. This absorbed carbon dioxide gives trouble not only because of being an unnecessary ballast and reducing the content of magnesium oxide in the raw material, but in a greater extent because of the danger of a reoxidation of the vaporized magnesium. In the reduction furnace there escape at first the moisture and the carbon dioxide from the reaction mixture and only afterwards, at higher temperature, the reduction takes place. However, as the reaction mixture has a very low thermal conductivity, some parts of the mixture can be already at reducing temperature whereas other parts have only reached the calcining temperature. In this manner carbon dioxide and magnesium vapors are produced at the same time and react together and form magnesium oxide and carbon. Carbon monoxide, which reacts also with the magnesium vapors, is formed as intermediary product.

One must endeavour to subject such a burnt dolomite to the reduction, which contains as little carbonic acid (carbon dioxide) as possible.

The present invention relates to a process of producing a burnt dolomite which absorbs only very slowly carbonic acid from the air. The invention consists in heating to the burning temperature of the dolomite, for example to 900-1000° C., the crushed or pulverized dolomite together with a fluoride, preferably with a fluoride of a metal of the group comprising calcium, barium, strontium, magnesium, aluminum and iron. It is the best to use calcium fluoride, as this raw material is cheap and accelerates the reduction. If the burnt dolomite is to be used for the thermal production of magnesium, it is not suitable to use an alkali fluoride, as during the following reduction the corresponding alkali metal is formed and condensed together with the magnesium. The amount of the fluoride addition can vary between wide lin its. It is for example of 0.2-5% (calculated on the raw dolomite), preferably 1.5-3%. Of course the fluoride must be finely divided. It is possible to use mixtures of fluorides, that is to say two or more fluorides together, or also double fluorides such as cryolite; with the last compound there must be taken into account that during the following reduction of the burnt dolomite metallic sodium is formed beside magnesium.

The process can be carried out either with crude dolomite or with burnt dolomite. It is of course simpler to use crude dolomite, to pulverize it, to mix it with the suitable amount of fluoride and then to burn it. Whereas a dolomite burnt without addition of fluoride became increased in weight by 25% after having been stored during 150 hours at the air, an increase of weight of only 0.15% was measured with a dolomite according the invention burnt with an addition of 3% calcium fluoride.

One can also pulverize the dolomite after burning, then mix it with a fluoride and reheat it up to the burning temperature of the dolomite. However, this method is less economical because of the repeated heating.

The burnt dolomite produced according to the present invention can be used for other purposes than for the thermal production of magnesium.

What I claim is:

1. The process of producing a burned dolomite comprising mixing the dolomite with a small proportion of a fluoride of a metal of the group consisting of calcium, barium, strontium, magnesium, aluminum and iron, both materials being in a crushed or finely reduced condition; and then heating the mixture to a suitable burning temperature of the dolomite between about 900° and 1000° Centigrade for a substantial reaction period; thereby resulting in a burned dolomite effectively resistant to the absorption of substantial proportions of carbon dioxide.

2. The process as in claim 1 and wherein the fluoride by weight is between 0.2 and 5.0 percent of the dolomite.

3. The process as in claim 1 and wherein the fluoride by weight is between about 1.5 and 3.0 percent of the dolomite.

4. In the industrial production of magnesium from dolomite by a process comprising the preliminary thermal conversion of the dolomite to yield magnesia followed by high temperature reduction of the magnesia to magnesium and isolation of the metal by distillation, the step of converting the dolomite which consists in mixing it in pulverized condition with a small proportion of an agent selected from the group consisting of the fluorides of magnesium, calcium, barium, aluminum, strontium and iron and calcining such mixture at a temperature between about 900° and 1000° centrigrade thereby to yield magnesia and lime in a form wherein the magnesia is highly resistant to the absorption of carbon dioxide; whereby effectively to avoid substantial production loss by reoxidation of the magnesium during its subsequent reduction and distillation.

WERNER SYZ.